UNITED STATES PATENT OFFICE.

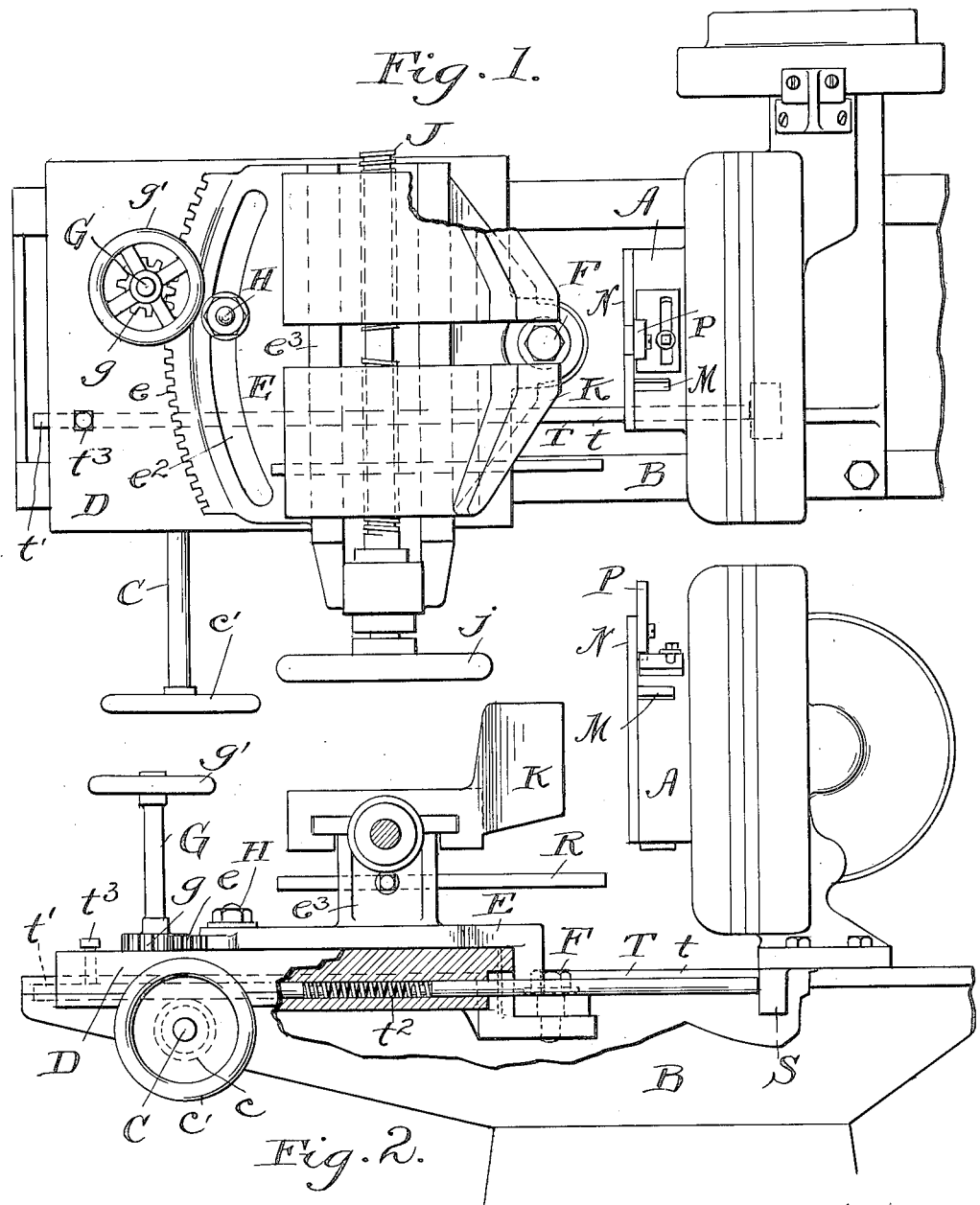

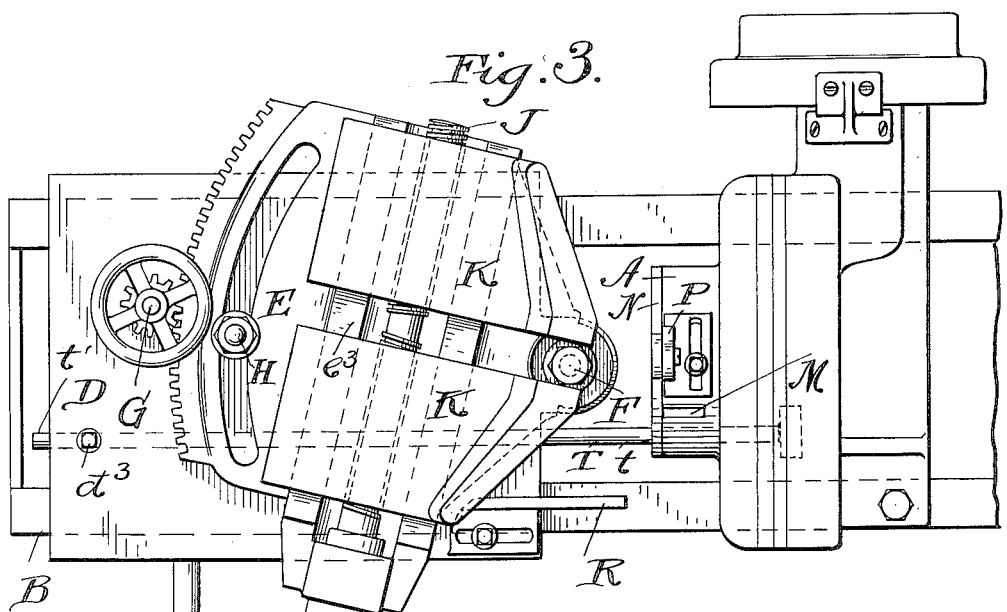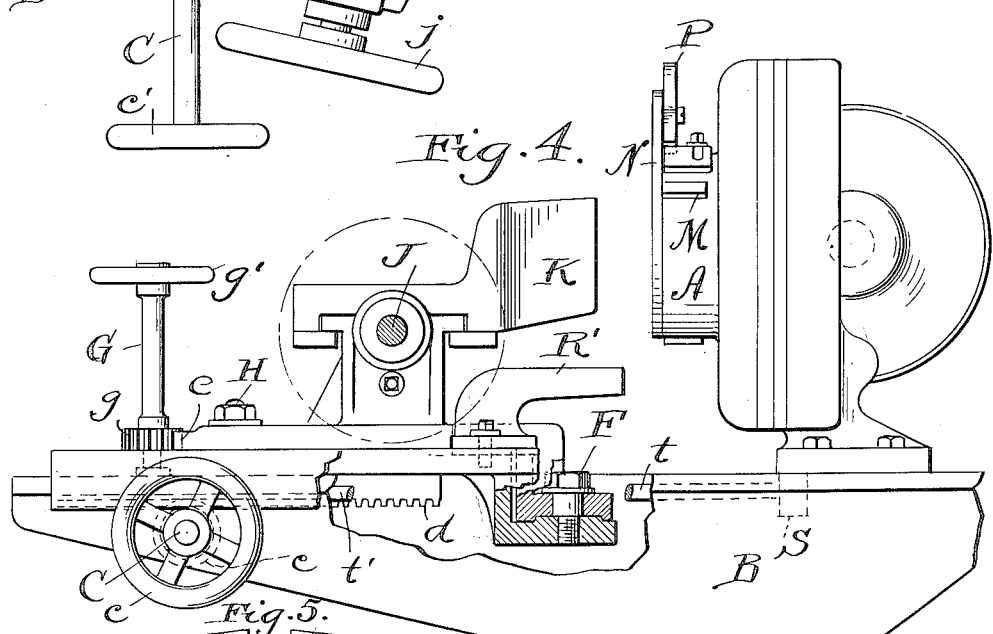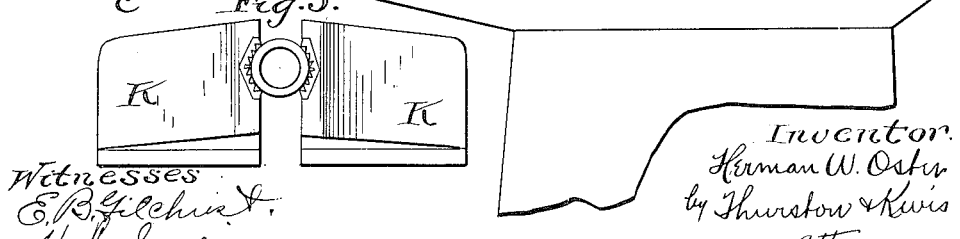

HERMAN W. OSTER, OF CLEVELAND, OHIO, ASSIGNOR TO THE OSTER MANUFACTURING COMPANY, OF CLEVELAND, OHIO, A CORPORATION OF OHIO.

GEARED DIE-STOCK.

1,075,059.

Specification of Letters Patent.  Patented Oct. 7, 1913.

Application filed December 1, 1911. Serial No. 663,332.

*To all whom it may concern:*

Be it known that I, HERMAN W. OSTER, a citizen of the United States, residing at Cleveland, in the county of Cuyahoga and State of Ohio, have invented a certain new and useful Improvement in Geared Die-Stocks, of which the following is a full, clear, and exact description.

The object of this invention is to increase the capacity of a geared die stock both in respect to the kinds of work it may do and the rapidity with which it can do such work.

The invention consists in the construction and combination of parts shown in the drawing and hereinafter described and definitely pointed out in the claims.

In the drawing Figure 1 is a plan view and Fig. 2 is a side elevation, partly sectioned, of a geared die stock embodying the invention. Fig. 3 is a plan view of the same machine when adjusted for threading bent pipe. Fig. 4 is a side elevation partly sectioned of said machine; and Fig. 5 is an end view of the pipe holding jaws with a pipe in their grasp.

Referring to the parts by letters, A represents a rotatable die carrying head. The construction of this head, and of the means for turning it are no part of the present invention. Such constructions are, however, well understood in this art, and therefore require no detailed description here. The dies M are movable radially in the head, and their positions are controlled by a cam plate N, which is provided with a lever P which, when it occupies one position, prevents this cam plate from turning, and when it occupies another position, does not so restrain the turning of the cam plate, and may, in fact, be the thing to which power is applied to turn the cam plate. This lever and the parts associated with it may have substantially the construction and connection with the cam plate as shown in my prior patent No. 965,403.

On the bed B of the machine the carriage D is mounted so as to be movable toward and from said head. It has a rack $d$ on its under side for engagement with a pinion $c$ on the feed shaft C, which shaft has an operating hand wheel $c'$. The pipe holding jaws K are supported by this carriage. In the particular construction shown these jaws are not supported directly by the carriage, but are supported directly upon a part of the swinging pipe support E. This pipe support rests upon the carriage and is pivoted thereto at its front end by means of the vertical bolt F. On the rear end of this support is a segment rack $e$ which meshes with a pinion $g$ fixed to the vertical shaft G which is rotatably mounted on the carriage, and has at its upper end an operating hand wheel $g'$. There is also a segmental slot $e^2$ in said pipe support; and a bolt H goes through this slot and screws into the carriage, so that, after the pipe support has been swung to the desired position, it may be firmly fixed in that position. This pipe support has a raised transversely extended member $e^3$ upon which the two pipe holding jaws K are movably mounted and guided. A right and left hand screw J is mounted in the part $e^3$ and engages respectively with these two jaws, and has an operating hand wheel $j$ on its end, by which it may be turned. The turning of this screw causes the jaws to move simultaneously and equally toward and from each other and a vertical plane which passes through the axis of the above mentioned bolt F. When the machine is to be used to thread straight pipe, the pipe support is swung into the position shown in Fig. 1, so that the prolongation of the axis of the die head will pass between these two jaws. If, however, it is desired to cut a thread upon the end of a bent piece of pipe, one part of the pipe is clamped between the jaws, and then the pipe support is turned upon its pivot bolt F until the end of the pipe to be threaded comes into a position such that its axis is coincident with the axis of the die head.

When the parts have been properly adjusted and the pipe is clamped between the jaws the die head is set in rotation and the carriage is moved toward it, so as to present the pipe to the action of the dies. The operator will turn the hand wheel $c'$, and so move the carriage in the feeding direction until the dies have gotten a good start at cutting the thread. Thereafter the dies, by their action upon the pipe, will draw the pipes along, and, of course, will compel the carriage to follow.

A throw out bar R will be fixed to the carriage or something which moves with the carriage. This bar may, for example, be adjustably fixed in a hole in the transverse member $e^3$ of the pipe support, as shown in Figs. 1 and 2; or, if preferred, this throw out member may have a little different shape, as shown by R', in Figs. 3 and 4, and may be fixed to the top of the carriage. For some practical reasons it is preferable to employ the construction shown in Figs. 1 and 2 when straight pipe is being threaded; but this construction, obviously, cannot be employed when bent pipe is being threaded, and when, therefore, the pipe support has been swung upon its pivot. In that event the construction shown in Figs. 3 and 4 will be employed. This throw out member is adjusted so that when the die head shall have made the requisite number of turns to cut a thread of the required length upon the pipe presented to it, the throw out lever P will strike the member R, thereby unlocking the cam plate from the die head, and holding the cam plate against turning while the die head turns. The result of this relative turning of the cam plate and die head will be to draw the dies radially outward and disengage them from the pipe being threaded. In order that when this has been accomplished the carriage may quickly retract sufficiently, at least, to enable the pipe to be easily taken from the jaws, the adjustable spring retracting bar T is provided. This is composed of three parts, to wit, the two end members $t$ and $t'$ and an intermediate coil spring $t^2$, which is secured at its ends to the adjacent ends of the two bars $t$, $t'$. This composite bar is adjustably secured in a hole running lengthwise through the carriage by means of a set screw $t^3$ which engages with the rear member $t'$. On the frame of the machine is a lug S which is so placed that the front end of the front member $t'$ will come in contact with it at some time or other, depending upon the position in which it is adjusted. The adjustment should be such that this engagement of the rod $t$ and lug S will take place a considerable time before the dies are withdrawn from the work. Therefore, while the thread is being cut this member $t$ is being pushed back into the carriage and the spring $t^2$ is being compressed. As soon as the dies release their hold upon the work this spring will expand and will cause the quick movement of the carriage away from the die head.

Having described my invention, I claim:

1. In a geared die stock, the combination of a rotatable die head carrying adjustable dies, and means for moving said dies toward and from the work, with a carriage movable toward and from said die head, movable pipe jaws upon said carriage, an arm adjustably secured to said carriage and adapted to be moved by the carriage into a position to be engaged by the die moving means, and a spring actuated carriage retracting device adjustably secured to the carriage and adapted to engage a fixture just before said arm by its action causes the retraction of the dies.

2. In a geared die stock, the combination of a carriage on which are pipe holding jaws, with a carriage-retracting device mounted on said carriage and comprising two alined rods and an intermediate spring, and means for adjustably fixing the rear rod to said carriage, and a fixture with which the front end of the front rod may engage.

3. In a geared die stock, the combination of a carriage on which are pipe holding jaws and in which is a longitudinally extended hole which extends from its front end rearward, two rods and an intermediate spring connected with both rods, which parts are disposed in said hole with the front end of the front rod projecting, means for adjustably fixing the rear rod against movement in said hole, and a fixture against which the projecting end of the front rod may engage.

4. In a geared die stock in combination with a rotatable head which turns on a horizontal axis, a carriage movable horizontally toward and from said head, a pipe support pivoted on said carriage on a vertical axis which intersects the horizontal axis of the die head, mechanism for swinging said pipe support upon its pivot, mechanism for holding the pipe support in fixed position upon the carriage, two jaws mounted on said pipe support, and means for simultaneously moving said jaws toward and from each other.

In testimony whereof, I hereunto affix my signature in the presence of two witnesses.

HERMAN W. OSTER.

Witnesses:
E. B. GILCHRIST,
H. R. SULLIVAN.